United States Patent
Cheng et al.

(10) Patent No.: US 12,293,436 B2
(45) Date of Patent: May 6, 2025

(54) IMAGE RECONSTRUCTION METHOD, DEVICE, EQUIPMENT, SYSTEM AND COMPUTER-READABLE STORAGE MEDIUM

(71) Applicant: RAYCAN TECHNOLOGY CO., LTD. (SUZHOU), Suzhou (CN)

(72) Inventors: Ran Cheng, Suzhou (CN); Qingguo Xie, Suzhou (CN)

(73) Assignee: RAYCAN TECHNOLOGY CO., LTD. (SUZHOU) (CN)

( * ) Notice: Subject to any disclaimer, the term of this patent is extended or adjusted under 35 U.S.C. 154(b) by 362 days.

(21) Appl. No.: 17/791,093

(22) PCT Filed: Nov. 27, 2020

(86) PCT No.: PCT/CN2020/132370
§ 371 (c)(1),
(2) Date: Jul. 6, 2022

(87) PCT Pub. No.: WO2021/139439
PCT Pub. Date: Jul. 15, 2021

(65) Prior Publication Data
US 2023/0036359 A1    Feb. 2, 2023

(30) Foreign Application Priority Data
Jan. 7, 2020    (CN) .......................... 202010012326.1

(51) Int. Cl.
*G06T 11/00* (2006.01)
*G06N 3/04* (2023.01)
(Continued)

(52) U.S. Cl.
CPC .............. *G06T 11/003* (2013.01); *G06N 3/04* (2013.01); *G06T 3/4007* (2013.01); *G06V 10/44* (2022.01)

(58) Field of Classification Search
CPC ..... G06T 11/003; G06T 3/4007; G06V 10/44; G06N 3/04
(Continued)

(56) References Cited

FOREIGN PATENT DOCUMENTS

| CN | 109949223 A | 6/2019 |
|----|-------------|--------|
| CN | 111223163 A | 6/2020 |

OTHER PUBLICATIONS

Muqeet, Abdul, Md Tauhid Bin Iqbal, and Sung-Ho Bae. "Hybrid residual attention network for single image super resolution." arXiv preprint arXiv:1907.05514 (2019). (Year: 2019).*
(Continued)

*Primary Examiner* — Jonathan S Lee
(74) *Attorney, Agent, or Firm* — Dickinson Wright PLLC (57) ABSTRACT

The present application provides an image reconstruction method, a device, equipment, a system, and a computer-readable storage medium. Said method comprises: obtaining a target reconstruction model (S1); invoking a first convolutional layer in the obtained target reconstruction model to extract shallow layer features from the obtained image to be reconstructed (S2); invoking a residual network module in the target reconstruction model to obtain middle layer features from the shallow layer features (S3); invoking a densely connected network module in the target reconstruction model to obtain deep layer features from the middle layer features (S4); and invoking a second convolutional layer in the target reconstruction model to perform image reconstruction on the deep layer features so as to obtain a reconstructed image of the image to be reconstructed (S5). Said method improves the quality and resolution of a reconstructed image.

20 Claims, 8 Drawing Sheets (51) Int. Cl.
    *G06T 3/4007*    (2024.01)
    *G06V 10/44*    (2022.01)
(58) Field of Classification Search
    USPC .......................................................... 382/131
    See application file for complete search history.

(56) References Cited

OTHER PUBLICATIONS

Huang, Liqin, et al. "Pyramid-structured depth map super-resolution based on deep dense-residual network." IEEE Signal Processing Letters 26.12 (2019): 1723-1727. (Year: 2019).*
Wei, Wang, et al. "An advanced deep residual dense network (DRDN) approach for image super-resolution." International Journal of Computational Intelligence Systems 12.2 (2019): 1592-1601. (Year: 2019).*
Li, Kai, et al. "Survey of single image super-resolution reconstruction." IET Image Processing 14.11 (2020): 2273-2290. (Year: 2020).*
International Search Report for PCT Application No. PCT/CN2020/132370, dated Mar. 1, 2021, 6 pages.
Lim et al., "Enhanced Deep Residual Networks for Single Image Super-Resolution," Jul. 10, 2017, 9 pages, arXiv:1707.02921v1, Korea.
Zhang et al., "Residual Dense Network for Image Super-Resolution," Dec. 17, 2018, 10 pages, 2018 IEEE/CVF Conference on Computer Vision and Pattern Recognition.
Tong et al., "Image Super-Resolution Using Dense Skip Connections", Dec. 25, 2017, 9 pages, 2017 IEEE International Conference on Computer Vision (ICCV), China.

* cited by examiner

IMAGE RECONSTRUCTION METHOD, DEVICE, EQUIPMENT, SYSTEM AND COMPUTER-READABLE STORAGE MEDIUM

CROSS-REFERENCE TO RELATED APPLICATIONS

This application is a 371 of international PCT/CN2020/132370, filed on Nov. 27, 2020, which claims priority to Chinese Application No. 202010012326.1, filed on Jan. 7, 2020, and the contents of which are hereby incorporated by reference in their entireties.

FIELD OF THE INVENTION

The present application relates to the technical field of image processing, and in particular to an image reconstruction method, device, equipment, system and computer-readable storage medium.

BACKGROUND OF THE INVENTION

With the increasing development of science and technology, high-resolution images have application value in a very wide range. For example, in the field of medical image processing, high-resolution images help doctors determine the diseased region more accurately, so as to treat patients more efficiently. In the field of security inspection, high-resolution images can help security staff to see more clearly whether the luggage contains suspected illegal items so as to ensure the safety of passengers. In the field of consumer electronics, high-resolution images can enhance the subjective visual experience, so as to improve the user experience. Therefore, how to obtain high-resolution images is very important.

Currently, the image resolution is improved mainly from two aspects, namely the hardware and software algorithms. However, improving image resolution from the aspect of hardware requires high cost and technical support. In terms of software algorithms, most of them use interpolation methods to reconstruct the images so as to improve the image resolution. At present, typical interpolation methods mainly comprise nearest neighbor interpolation method, bilinear interpolation method and bicubic interpolation method. The nearest neighbor interpolation method mainly assumes that the pixel value corresponding to the position to be interpolated is the known pixel value closest to this point. This method is relatively simple, but it is easy to produce artifacts with jagged edges and blurring images. The bilinear interpolation method mainly uses the pixel values of four adjacent points around the position to be interpolated to select and determine the pixel value of the position to be interpolated. This method does not lead to too many blurring artifacts, but it loses detail information values in the edge detail processing, so that the obtained image resolution is not very high. The bicubic interpolation method uses the pixel values of 4*4=16 adjacent points around the position to be interpolated to select and determine the pixel value of the position to be interpolated. This method effectively improves jaggies produced by the nearest neighbor interpolation method and effectively preserves the edge details. However, the computational amount is relatively large and the data processing speed is relatively slow.

When using the above interpolation methods to reconstruct the image, only a simple interpolation operation is used without considering the result characteristics, so the reconstructed image obtained will give a smooth and blurring feeling visually and the image resolution is not very high.

SUMMARY OF THE INVENTION

The embodiments of the present application aim to provide an image reconstruction method, device, equipment, system and computer-readable storage medium, to solve at least one problem existing in the prior art.

In order to solve the above technical problems, the technical solution of the present application is to provide an image reconstruction method, which comprises:
  invoking a convolution module in a target reconstruction model to perform image reconstruction on a obtained image to be reconstructed so as to obtain a first image;
  invoking a residual network module in the target reconstruction model to perform image reconstruction on the first image so as to obtain a second image;
  invoking a densely connected network module in the target reconstruction model to perform image reconstruction on the second image so as to obtain a third image;
  wherein, the resolutions of the first image, the second image and the third image are successively increased.

Optionally, before performing image reconstruction on the obtained image to be reconstructed, the image reconstruction method further comprises:
  obtaining multiple different sample image groups as training data, each sample image group including a high-resolution image and a low-resolution image obtained by processing the high-resolution image;
  using the obtained sample image groups to train the constructed deep learning model, and determining the deep learning model which reaches the optimal training effect as the target reconstruction model.

Optionally, the low-resolution image is obtained by processing the high-resolution image using an image scaling algorithm which comprises a bicubic interpolation method or a bilinear interpolation method.

Optionally, before performing image reconstruction on the obtained image to be reconstructed, the image reconstruction method further comprises:
  obtaining the pre-trained target reconstruction model from an external device.

Optionally, the residual neural network module comprises a first convolutional layer, multiple residual units and a second convolutional layer which are connected in sequence; and accordingly, the steps of invoking a residual network module in the target reconstruction model to perform image reconstruction on the first image so as to obtain a second image comprise:
  invoking the first convolutional layer to extract shallow layer feature information in the first image;
  invoking the residual units to extract deep layer feature information from the shallow layer feature information which is output by the first convolutional layer;
  invoking the second convolutional layer to process the shallow layer feature information and the deep layer feature information to obtain the second image.

Optionally, the image reconstruction method further comprises:
  invoking a sub-pixel convolutional layer in the target reconstruction model to perform up-sampling on the third image which is output by the densely connected network module.

Optionally, the image to be reconstructed comprises a CT image, an MRI image, a PET image or a PET/CT image of a target position or organ in organism.

The embodiment of the present application also provides an image reconstruction device, which can comprise:
- a first invoking unit which is configured to invoke a convolution module in a target reconstruction model to perform image reconstruction on a obtained image to be reconstructed so as to obtain a first image;
- a second invoking unit which is configured to invoke a residual neural network module in the target reconstruction model to perform image reconstruction on the first image so as to obtain a second image;
- a third invoking unit which is configured to invoke a densely connected network module in the target reconstruction model to perform image reconstruction on the second image so as to obtain a third image;
- wherein, the resolutions of the first image, the second image and the third image are successively increased.

The embodiment of the application also provides a computer equipment which can comprise a memory and a processor, wherein the memory stores a computer program, and when the computer program is executed by the processor, the processor executes the above mentioned image reconstruction method.

The embodiment of the application also provides an image processing system which comprises the above mentioned computer equipment and a detection equipment, wherein the detection equipment is configured to obtain an image to be reconstructed by means of performing radiation detection on a target object and to provide the obtained image to be reconstructed to the computer equipment.

Optionally, the detection equipment comprises a CT scanner, an MM scanner, a PET detector, or PET/CT equipment.

The embodiment of the application also provides a computer-readable storage medium, which stores a computer program, wherein the above mentioned image reconstruction method can be realized when the computer program is executed.

It can be seen from the technical solution provided by the above embodiments of the present application that the embodiments of the present application process the image to be reconstructed by successively invoking the convolution module, residual network module and densely connected network module in the target reconstruction model, so as to obtain the reconstructed image with super-resolution, which can improve the quality of the reconstructed image. Moreover, the data processing speed can be improved by using the target reconstruction model to perform image reconstruction processing on the image to be reconstructed.

BRIEF DESCRIPTION OF THE DRAWINGS

In order to describe the embodiments of the present application or the technical solutions in the prior art more clearly, the accompanying drawings that need to be used in the description of the embodiments or the prior art will be briefly introduced below. It is obvious that the drawings that accompany the following description are only some of the embodiments recorded in the present application. As for the person skilled in the art, various alternatives to the drawings can be obtained from these drawings without creative labor.

Wherein.

DESCRIPTION OF THE PREFERRED EMBODIMENTS

The technical solutions in the embodiments of the present application will be described clearly and completely below in combination with the accompanying drawings in the embodiments of the application. Obviously, the described embodiments are used to just explain part of the embodiments of the present application but not all, and are not intended to limit the scope of the present application or the claims. Based on the embodiments in the present application, all other embodiments obtained by the person skilled in the art without making creative work should fall within the protection scope of the present application.

It should be noted that when a component is referred to as "being disposed on" another component, it can be directly disposed on another component or there can be components in between. When a component is referred to as "being connected/coupled" to another component, it can be directly connected/coupled to another component or there may be components in between at the same time. The term "connected/coupled" used herein may comprise being electrically and/or mechanically physically connected/coupled. The term "comprise/include" used herein refers to the presence of features, steps or elements, but does not exclude the presence or addition of one or more other features, steps or elements. The term "and/or" used herein includes any and all combinations of one or more related listed items.

Unless otherwise defined, all technical and scientific terms used herein have the same meanings as those commonly understood by those skilled in the technical field of the present application. The terms used herein are only intended to describe specific embodiments and are not intended to limit the present application.

In addition, in the description of the present application, the terms "first", "second", "third" and the like are only used for description and distinguishing similar objects. There is no order between two objects, nor can they be understood as indicating or implying relative importance. In addition, in the description of the application, unless otherwise specified, "multiple" means two or more.

Figure 1:
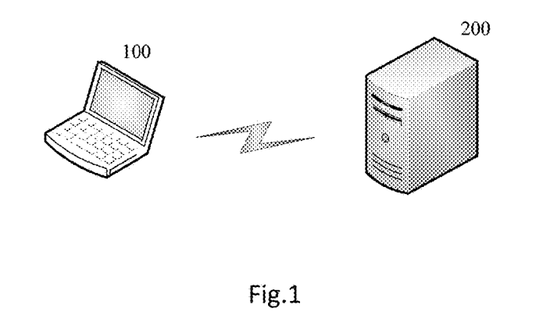
FIG. 1 is an application environment diagram of an image reconstruction method in an embodiment of the present application.

FIG. 1 is an application environment diagram of an image reconstruction method in an embodiment. Referring to FIG. 1, the method can be applied to the computer equipment. The computer equipment includes a terminal 100 and a server 200 connected through a network. The method can be executed in the terminal 100 or the server 200. For example, the terminal 100 can directly obtain an original image of the target object from the detection equipment, and execute the above method on the terminal side. Alternatively, the terminal 100 may also transmit the original image to the server 200 after acquiring the original image of the target object, so that the server 200 acquires the original image of the target object and executes the above method. The terminal 100 may be a desktop terminal (e.g., a desktop computer) or a mobile terminal (e.g., a notebook computer). The server 200 may be implemented using an independent server or a server cluster composed of multiple servers.

Figure 2:
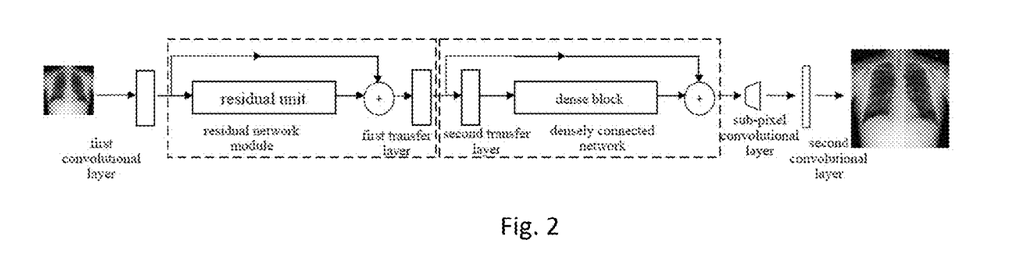
FIG. 2 is a structural schematic diagram of a target reconstruction model used in an embodiment of the present application.

FIG. 2 is a structural schematic diagram of a target reconstruction model used in an embodiment of the present application. Referring to FIG. 2, the target reconstruction model can be a deep convolutional neural network model, wherein each network parameter can be determined by training a large amount of training data. The target reconstruction model can include a first convolutional layer, a residual network module, a densely connected network module and a second convolutional layer. Wherein, the first convolutional layer can be used to extract multiple groups of first feature vectors as shallow layer features from the received low-resolution image according to the preset convolution kernel, and send the extracted shallow layer features directly to the residual network module. The extracted shallow layer features usually contain some small detail information, such as the edge, angle, color, pixel, gradient, etc. of the input image. The residual network module can be used to obtain middle layer features from the shallow layer features sent by the convolution module, and send the obtained middle layer features to the densely connected module. The obtained middle layer features include part of shallow layer features and part of features with certain semantic information, which preliminarily show part of the shape of the input image. The densely connected network module can be used to obtain deep layer features from the middle layer features sent by the residual network module. These deep layer features can be used to identify and/or detect the shape, texture, etc. of the target region in the image, containing richer semantic information.

Figure 3:
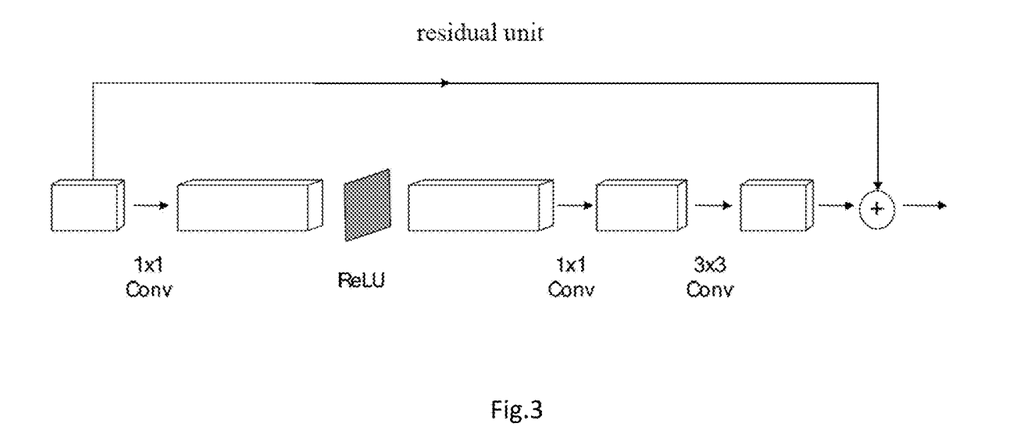
FIG. 3 is a structural schematic diagram of a residual network module in the target reconstruction model.

The residual network module can be but is not limited to enhanced deep residual network (EDSR), wide deep residual network (WDSR) or other neural network structures. The residual network module may include multiple (such as, 4) residual units and each residual unit may comprise multiple (such as, 3) convolutional layers and a rectified linear unit (ReLU), as shown in FIG. 3.

Figure 4:
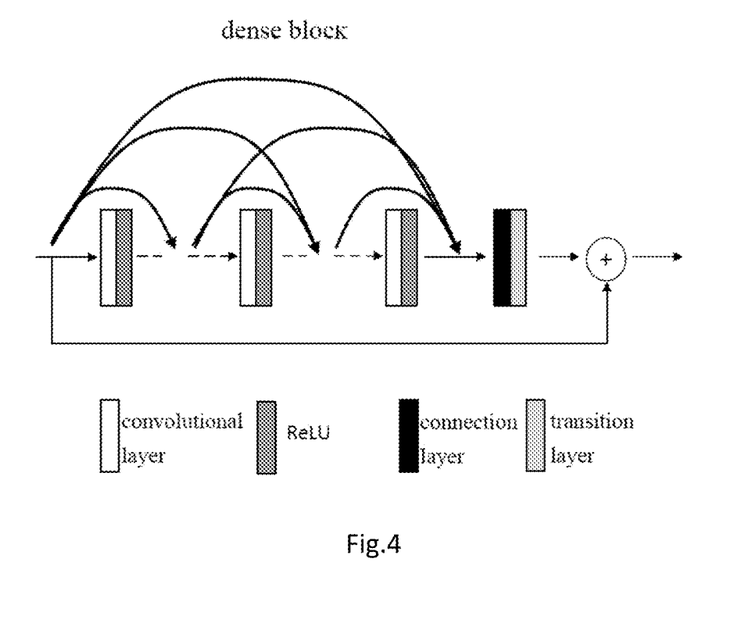
FIG. 4 is a structural schematic diagram of a densely connected network module in the target reconstruction model.

The densely connected network module can be a densely connected convolutional neural network, which may comprise multiple (for example, N, wherein N is a positive integer greater than 1) dense blocks. As shown in FIG. 4, each dense block may comprise one or more convolutional layers, ReLUs, connection layers and transition layers, and there is a direct connection between any two network layers in each dense block. That is to say, in a dense block, the input of each network layer is the union of the outputs of all previous network layers, and the feature vectors which are output by the network layer will also be directly transmitted to all subsequent network layers, so as to realize the reuse of the feature vectors. The network layer herein refers to a convolutional layer, a ReLU, a connection layer, or a transition layer, etc.

The second convolutional layer can be used to perform image reconstruction on deep layer features which are output by the densely connected network.

In addition, the target reconstruction model may also include a sub-pixel convolutional layer arranged between the densely connected network module and the second convolutional layer, which can be used to perform up-sampling on the deep layer features which are output by the densely connected network module so as to enlarge the sizes of the deep layer features, thus improving the subsequent image reconstruction effect.

Figure 5:
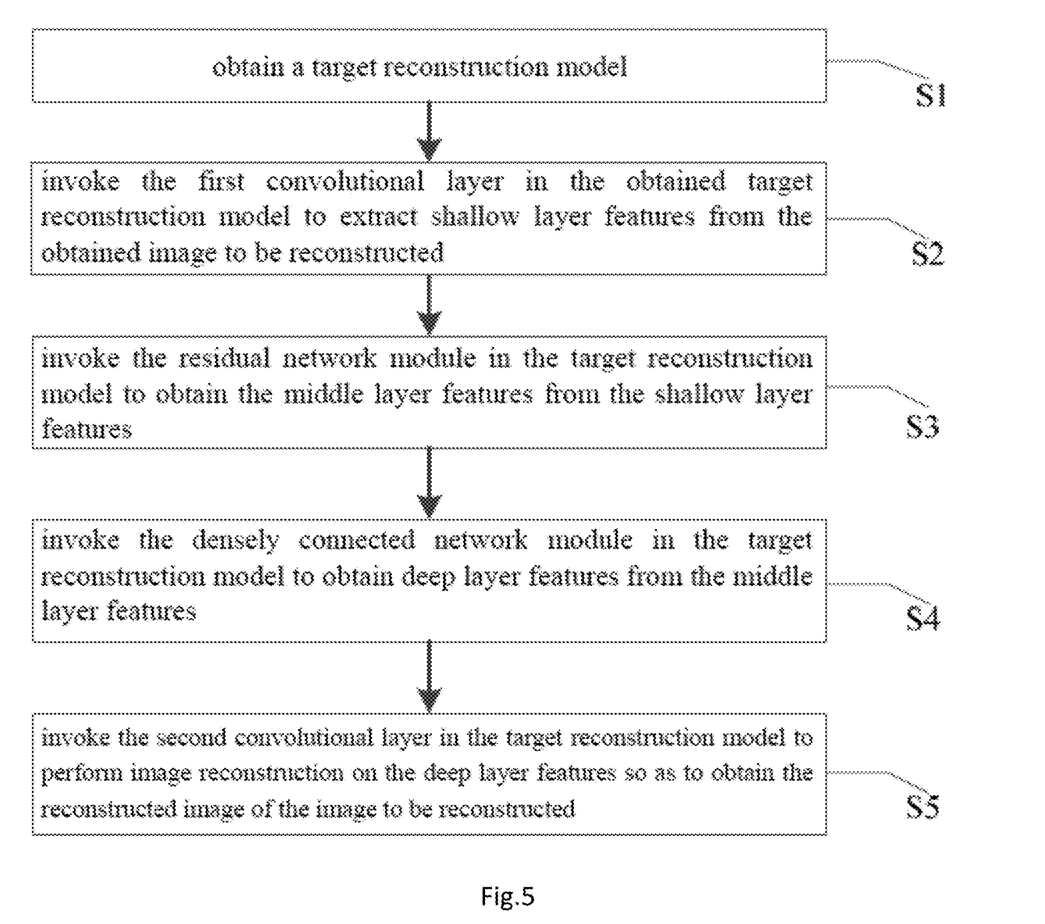
FIG. 5 is a schematic flow diagram of an image reconstruction method provided by an embodiment of the present application.

In one embodiment, the present application provides an image reconstruction method, as shown in FIG. 5. The method can specifically include the following steps:

S1: Obtain a target reconstruction model.

The target reconstruction model may refer to a deep convolutional neural network model, which may include a first convolutional layer, a residual network module, a densely connected network module and a second convolutional layer. As for the detailed description of the target reconstruction model, please refer to the detailed description in FIGS. 2-4 above.

This step may specifically comprise obtaining a pre-trained target reconstruction model from an external device (e.g., a device dedicated to training an image reconstruction model), or obtaining a target reconstruction model by training a locally constructed deep learning model with training data.

The above mentioned second method to obtain the target reconstruction model may specifically comprise the following steps:

(1) Obtain Multiple Different Sample Image Groups as Training Data.

Different sample image groups can mean that the resolutions of the images contained in each sample image group are different, or the contents of the images contained in each sample image group are different. For example, the first sample image can be a CT image of a human chest, and the second sample image can be a CT image of a human head.

A large number of (for example, more than 1000) different sample image groups can be obtained from the processed sample image library, and each sample image group may include a high-resolution image and a low-resolution image obtained by processing the high-resolution image. For example, a image scaling algorithm such as a bicubic interpolation method or a bilinear interpolation method can be used to perform down-sampling on the high-resolution image to obtain the low-resolution image.

The high-resolution image herein can refer to an image processed by various filters, the resolution of which can generally reach about 1000×2000 or higher. The low-resolution image generally refers to an image containing noise and/or artifacts, the resolution of which may be ⅓, ¼, ⅛ or less of that of the high resolution image.

(2) Use the Obtained Sample Image Groups to Train the Constructed Deep Learning Model, and Determine the Deep Learning Model which Reaches the Optimal Training Effect as the Target Reconstruction Model.

After obtaining the sample image groups as training data, the constructed deep learning model can be trained by using the sample images in the sample image groups, and the network parameters which reaches the optimal training effect are determined as the final parameters of the deep learning model, and the deep learning model that determines the network parameters is determined as the target reconstruction model. Reaching the optimal training effect herein can mean that the output reconstructed image has the highest similarity with the original high-resolution image.

The specific training process can refer to the relevant descriptions in the prior art and will not be described herein.

After receiving the image to be reconstructed, the trained target reconstruction model can be used to perform image reconstruction on the image to be reconstructed so as to obtain a super-resolution image.

S2: Invoke the first convolutional layer in the obtained target reconstruction model to extract shallow layer features from the obtained image to be reconstructed.

The image to be reconstructed may refer to a low-resolution image which requires image reconstruction, which may comprise but is not limited to a CT image, an MRI image, a PET image or a PET/CT image of a target position or organ in organism (e.g., a person or a pet), such as a CT image of a human chest, or a CT image of a security item.

The first convolutional layer in the target reconstruction model can be invoked to extract multiple groups of first feature vectors as shallow layer features from the image to be reconstructed, and the extracted shallow layer features are transmitted to the residual network module. For example, the first convolutional layer can extract shallow layer features including 128 groups of first feature vectors from the image to be reconstructed according to its internal preset convolution kernel in the size of 3×3, and transmit the shallow layer features directly to the residual network module without any processing.

S3: Invoke the residual network module in the target reconstruction model to obtain the middle layer features from the shallow layer features.

After the convolution module outputs the shallow layer features, the residual network module can be invoked to obtain the middle layer features from the shallow layer features output by the convolution module. Specifically, multiple residual units in the residual network module can be invoked to obtain multiple groups of second feature vectors from the shallow layer features output from the first convolutional layer, and the obtained multiple groups of second feature vectors are added to the shallow layer features to obtain the middle layer features. Finally, the obtained middle layer features are transferred to the densely connected module through a first transfer layer.

S4: Invoke the densely connected network module in the target reconstruction model to obtain deep layer features from the middle layer features.

After the residual network module outputs the middle layer features, the densely connected network module can be invoked to obtain the deep layer features from the middle layer features. Specifically, multiple dense blocks in the densely connected network module can be invoked to obtain multiple groups of third feature vectors from the middle layer features, and the obtained multiple groups of third feature vectors can be added to the middle layer features to obtain deep layer features, and the obtained deep layer features can be transferred to the second convolutional layer through a second transfer layer.

The specific process of how dense blocks obtain the third feature vectors can refer to the relevant descriptions in the prior art and will not be described herein.

The feature vectors can be reused by invoking the densely connected network module to process the middle layer features, thereby all the feature information in the image can be retained, which can improve the reliability of the subsequent reconstructed image.

S5: Invoke the second convolutional layer in the target reconstruction model to perform image reconstruction on the deep layer features so as to obtain the reconstructed image of the image to be reconstructed.

After the densely connected network module outputs the deep layer features, the second convolutional layer can be invoked to perform image reconstruction on the deep layer features so as to obtain the reconstructed image of the image to be reconstructed, and the obtained reconstructed image can be regarded as a super-resolution image. The specific process of how the convolutional layer performs image reconstruction on deep layer features can refer to the relevant descriptions in the prior art and will not be described herein.

Figure 6:
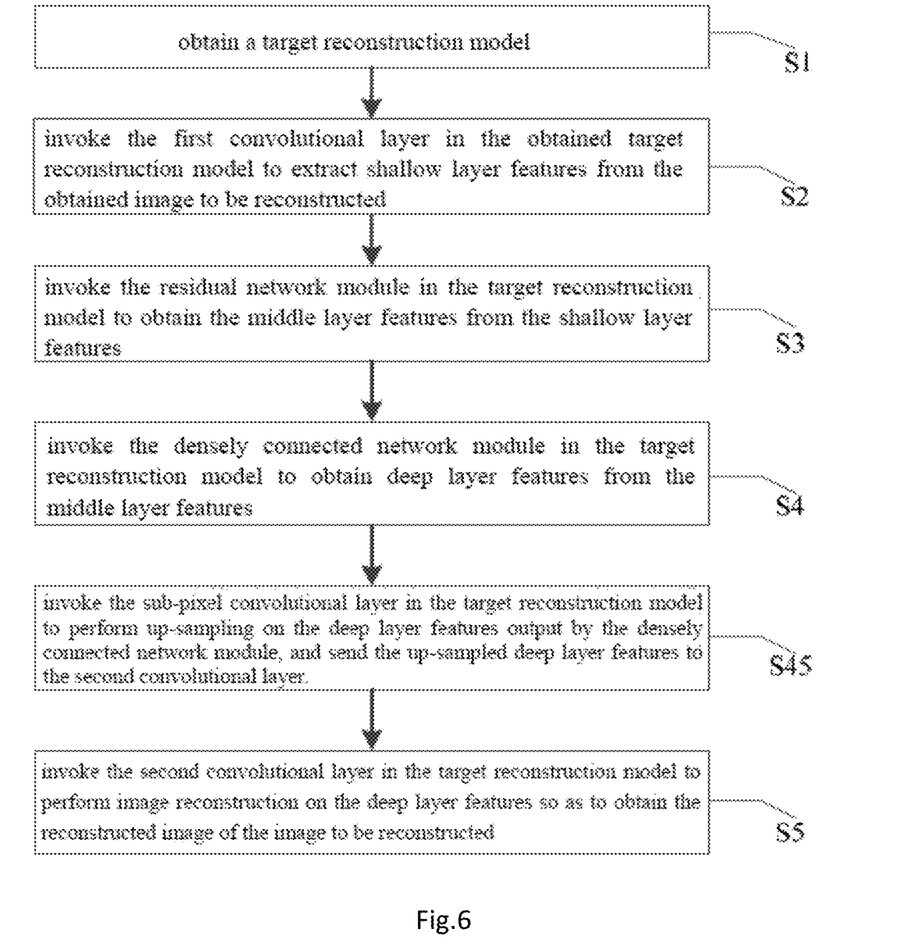
FIG. 6 is a schematic flow diagram of an image reconstruction method provided by another embodiment of the present application.

In another embodiment of the present application, as shown in FIG. 6, after obtaining the deep layer features, the image reconstruction method may further include:

S45: Invoke the sub-pixel convolutional layer in the target reconstruction model to perform up-sampling on the deep layer features output by the densely connected network module, and send the up-sampled deep layer features to the second convolutional layer.

After the densely connected network module outputs the deep layer features, the sub-pixel convolutional layer can be invoked to perform up-sampling on the deep layer features so as to enlarge the sizes of the deep layer features, and then the deep layer features in the enlarged sizes can be sent to the second convolutional layer.

By invoking the sub-pixel convolutional layer to enlarge the sizes of deep layer features, the resolution of subsequent reconstructed image can be improved.

It can be seen from the above description that the embodiments of the present application obtains a super-resolution reconstructed image by successively using the first convolutional layer, the network residual module, the densely connected module and the second convolutional layer in the target reconstruction model to perform image reconstruction on the image to be reconstructed, which improves the resolution of the reconstructed image and improves the user experience. Moreover, the data processing speed can be improved by using the target reconstruction model to perform image reconstruction on the image to be reconstructed. In addition, since the image to be reconstructed may be a CT image or a PET image, etc. of the patient, the doctor can be effectively assisted in diagnosing the patient by using the technical solution provided by the embodiments of the present application to obtain the super-resolution reconstructed image.

Figure 7:
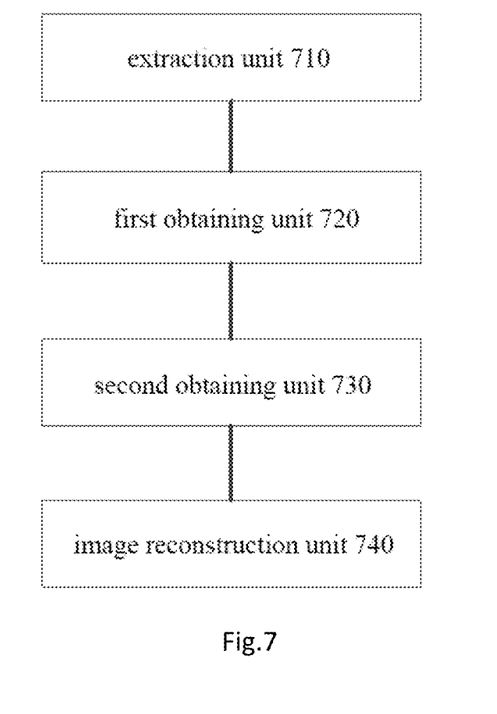
FIG. 7 is a structural schematic diagram of an image reconstruction device provided by an embodiment of the present application.

As shown in FIG. 7, an embodiment of the present application also provides an image reconstruction device, on which a trained target reconstruction model is provided. The target reconstruction model comprises a first convolutional layer, a residual network module, a densely connected network module and a second convolutional layer. The image reconstruction device may comprise:

an extraction unit 710, which may be configured to invoke the first convolutional layer to extract the shallow layer features in the obtained image to be reconstructed;

a first obtaining unit 720, which may be configured to invoke the residual network module to obtain the middle layer features from the shallow layer features;

a second obtaining unit 730, which may be configured to invoke the densely connected network module to obtain deep layer features from the middle layer features; and an image reconstruction unit 740, which may be configured to invoke the second convolutional layer to perform image reconstruction on the deep layer features so as to obtain a reconstructed image of the image to be reconstructed.

In another embodiment, the image reconstruction device may further include an up-sampling processing unit (not shown in the figure), which may be configured to invoke the sub-pixel convolutional layer in the target reconstruction model to perform up-sampling on the deep layer features output by the densely connected network module.

As for the specific description of the above units, please refer to the description of steps S1-S5 of the method of the above embodiment, which will not be repeated herein.

The above device can improve the resolution of the reconstructed image and the data processing speed by using the invoking units to perform image reconstruction processing on the image to be reconstructed.

Figure 8:
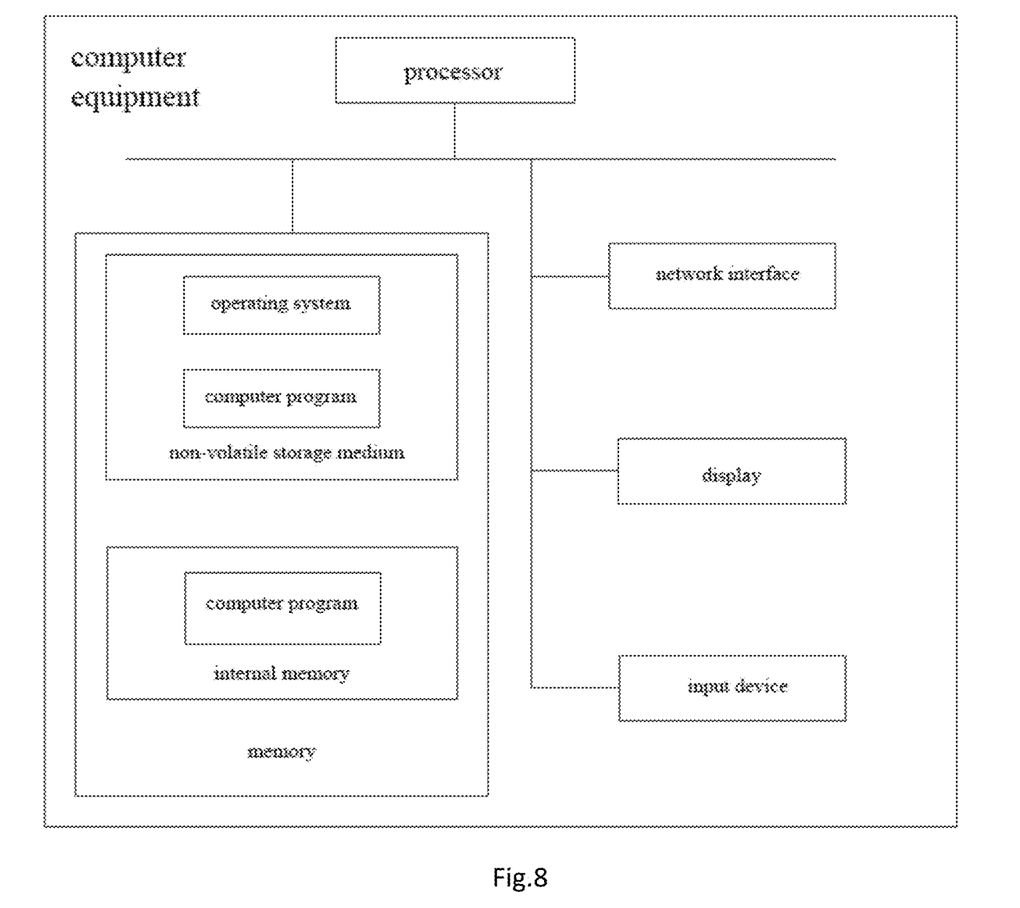
FIG. 8 is a structural schematic diagram of the computer equipment in an embodiment of the present application.

FIG. 8 shows a structural schematic diagram of the computer equipment in an embodiment. The computer equipment may specifically be the terminal 100 in FIG. 1. As shown in FIG. 8, the computer equipment comprises a processor, a memory, a network interface, an input device, and a display connected through system buses. Wherein, the memory comprises a non-volatile storage medium and an internal memory. The non-volatile storage medium of the computer equipment stores an operating system and can also store a computer program. When the computer program is executed by the processor, the processor can execute the image reconstruction method described in the above embodiment. The computer program can also be stored in the internal memory. When the computer program is executed by the processor, the image reconstruction method described in the above embodiment is executed.

Figure 9:
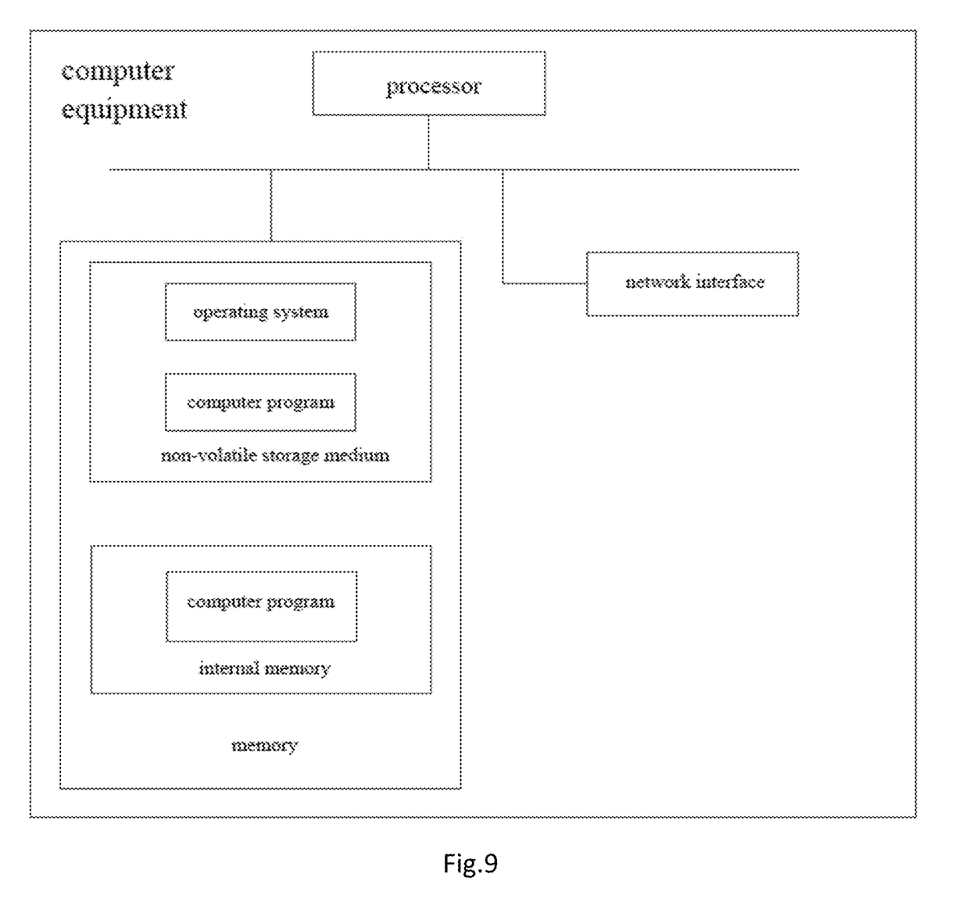
FIG. 9 is a structural schematic diagram of the computer equipment in another embodiment of the present application.

FIG. 9 shows a structural schematic diagram of the computer equipment in another embodiment. The computer equipment may specifically be the server 200 in FIG. 1. As shown in FIG. 9, the computer equipment comprises a processor, a memory and a network interface connected through system buses. Wherein, the memory comprises a non-volatile storage medium and an internal memory. The non-volatile storage medium of the computer equipment stores an operating system and can also store a computer program. When the computer program is executed by the processor, the processor can execute the image reconstruction method described in the above embodiment. The computer program can also be stored in the internal memory. When the computer program is executed by the processor, the image reconstruction method described in the above embodiment is executed.

The person skilled in the art can understand that the structures shown in FIG. 8 and FIG. 9 are only block diagrams of partial structures related to the solution of the present application, and do not constitute a limitation on the computer equipment to which the solution of the present application is applied. The specific computer equipment may comprise more or less components than those shown in the figures, or combine some components, or have different component configurations.

Figure 10:
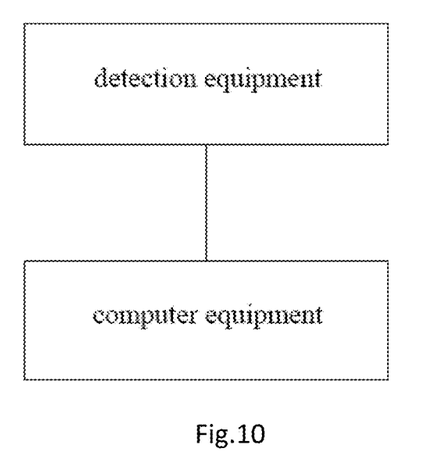
FIG. 10 is a structural schematic diagram of an image processing system in an embodiment of the present application.

In one embodiment, as shown in FIG. 10, the present application further provides an image processing system, which may comprise the computer equipment shown in FIG. 8 or FIG. 9 and the detection equipment connected to it. The detection equipment may be used to obtain an image to be reconstructed by performing radiation detection on a target object (e.g., a person, a pet, or a security item, etc.) and provide the obtained image to be reconstructed to the computer equipment. The detection equipment may be any equipment capable of detecting radioactive rays. For example, it may comprise but is not limited to a CT scanner, an MRI scanner, a PET detector or a PET/CT device.

In one embodiment, the application also provides a computer-readable storage medium which stores a computer program, wherein the computer program can realize the corresponding functions described in the method of above embodiments when executed. The computer program can also be run on the computer equipment as shown in FIG. 8 or FIG. 9. The memory of the computer equipment comprises various program modules constituting the device, and when the computer program constituted by various program modules is executed, the function corresponding to each step of the image reconstruction method described in the above embodiment can be realized.

The ordinary person skilled in the art can understand that all or part of the processes for realizing methods of the above embodiments can be completed by instructing relevant hardware through a computer program. The program can be stored in a non-volatile computer-readable storage medium, and when the program is executed, it can comprise the processes of the embodiments of the above various methods. Any reference to the memory, storage medium, database or other media used in the embodiments provided by the present application may comprise non-volatile and/or volatile memory. The non-volatile memory may comprise read-only memory (ROM), programmable ROM (PROM), electrically programmable ROM (EPROM), electrically erasable programmable ROM (EEPROM), or flash memory. Volatile memory may comprise random access memory (RAM) or external cache memory. As an illustration rather than a limitation, RAM is available in various forms, such as Static RAM (SRAM), Dynamic RAM (DRAM), Synchronous DRAM (SDRAM), Double Data Rate SDRAM (DDRSDRAM), Enhanced SDRAM (ESDRAM), Synchlink (synchronous link) DRAM (SLDRAM), Memory bus (Rambus) Direct RAM (RDRAM), Direct Memory bus (Rambus) Dynamic RAM (DRDRAM), and Memory bus (Rambus) Dynamic RAM (RDRAM), etc.

The system, device, equipment, unit and the like described in the above embodiments may be implemented by semiconductor chips, computer chips and/or entities, or by products with certain functions specifically. For the convenience of description, the above device is divided into various units which are separately described by function when describing the above device. Of course, when implementing the present application, the functions of various units can be realized in the same chip or multiple chips.

Although the present application provides the method operation steps as described in the above embodiments or flow diagrams, the method may comprise more or fewer operation steps based on conventional or non-creative labor. In the steps where there is no necessary causality logically, the execution sequence of these steps is not limited to the execution sequence provided by the embodiments of the present application.

Each embodiment in the present specification is described in a progressive manner. The same and similar parts between any two embodiments can be referred to each other. Each embodiment focuses on the differences from other embodiments. Moreover, the various technical features of the above embodiments can be combined arbitrarily. In order to simplify the description, all possible combinations of the various technical features in the above embodiments are not described. However, as long as there is no contradiction in the combination of these technical features, the combinations should be considered to be in the scope of the description.

The above embodiments are described for the convenience of the person skilled in the art to understand and practice the present application. Obviously, it is easy for the person skilled in the art to make various modifications to these embodiments and apply the general principles described here to other embodiments without creative labor. Therefore, the present application is not limited to the above embodiments. According to the disclosure of the present application, the improvements and modifications made by the person skilled in the art without departing from the scope of the present application should come within the protection scope of the present application.

The invention claimed is:

1. An image reconstruction method based on a target reconstruction model, wherein the target reconstruction model comprises a first convolutional layer, a residual network module, a densely connected network module and a second convolutional layer, and the image reconstruction method comprises:
    invoking the first convolutional layer to extract shallow layer features from an obtained image to be reconstructed;
    invoking the residual network module to obtain middle layer features from the shallow layer features;
    invoking the densely connected network module to obtain deep layer features from the middle layer features; and
    invoking the second convolutional layer to perform image reconstruction on the deep layer features so as to obtain a reconstructed image of the image to be reconstructed.

2. The image reconstruction method according to claim 1, wherein before extracting shallow layer features from the obtained image to be reconstructed, the image reconstruction method further comprises:
    obtaining multiple different sample image groups as training data, each sample image group including a high-resolution image and a low-resolution image obtained by processing the high-resolution image;
    using obtained sample image groups to train a constructed deep learning model; and
    determining the deep learning model which reaches an optimal training effect as the target reconstruction model.

3. The image reconstruction method according to claim 2, wherein the low-resolution image is obtained by processing the high-resolution image using an image scaling algorithm which comprises a bicubic interpolation method or a bilinear interpolation method.

4. The image reconstruction method according to claim 2, wherein the image to be reconstructed comprises one selected from the group consisting of a CT image, an MRI image, a PET image and a PET/CT image of a target position or organ in organism.

5. A computer equipment, comprising a memory and a processor, wherein the memory stores a computer program and once the computer program is executed by the processor, the processor executes an image reconstruction method according to claim 2.

6. A non-transitory computer-readable storage medium, which stores a computer program, wherein an image reconstruction method according to claim 2 is able to be realized when the computer program is executed.

7. A computer equipment, comprising a memory and a processor, wherein the memory stores a computer program and once the computer program is executed by the processor, the processor executes an image reconstruction method according to claim 2.

8. The image reconstruction method according to claim 1, wherein before extracting shallow layer features from the obtained image to be reconstructed, the image reconstruction method further comprises:
    obtaining a pre-trained target reconstruction model from an external device.

9. A computer equipment, comprising a memory and a processor, wherein the memory stores a computer program and once the computer program is executed by the processor, the processor executes an image reconstruction method according to claim 8.

10. The image reconstruction method according to claim 1, wherein the residual network module comprises multiple residual units; and accordingly, the step of invoking the residual network module to obtain the middle layer features from the shallow layer features comprises:
    using the multiple residual units to obtain second feature vectors from the received shallow layer features, and the obtained second feature vectors are added to the shallow layer features to obtain the middle layer features.

11. A non-transitory computer-readable storage medium, which stores a computer program, wherein an image reconstruction method according to claim 10 is able to be realized when the computer program is executed.

12. The image reconstruction method according to claim 1, wherein the densely connected network module comprises multiple dense blocks; and accordingly, the step of invoking the densely connected network module to obtain the deep layer features from the middle layer features comprises:
    using the multiple dense blocks to obtain third feature vectors from the received middle layer features, and the obtained third feature vectors are added to the middle layer features to obtain the deep layer features.

13. A computer equipment, comprising a memory and a processor, wherein the memory stores a computer program and once the computer program is executed by the processor, the processor executes an image reconstruction method according to claim 12.

14. The image reconstruction method according to claim 1, wherein before invoking the second convolutional layer to perform image reconstruction on the deep layer features, the image reconstruction method further comprises:
    invoking a sub-pixel convolutional layer in the target reconstruction model to perform up-sampling on the deep layer features output by the densely connected network module, and send the up-sampled deep layer features to the second convolutional layer.

15. The image reconstruction method according to claim 1, wherein the image to be reconstructed comprises one selected from the group consisting of a CT image, an MRI image, a PET image and a PET/CT image of a target position or organ in organism.

16. A computer equipment, comprising a memory and a processor, wherein the memory stores a computer program and once the computer program is executed by the processor, the processor executes an image reconstruction method according to claim 1.

17. An image processing system, comprising a computer equipment according to claim 16 and a detection equipment, wherein the detection equipment is configured to obtain an image to be reconstructed by performing radiation detection on a target object and to provide the obtained image to be reconstructed to the computer equipment.

18. The image processing system according to claim 17, wherein the detection device comprises one selected from the group consisting of a CT scanner, an MRI scanner, a PET detector and a PET/CT device.

19. A non-transitory computer-readable storage medium, which stores a computer program, wherein an image reconstruction method according to claim 1 is able to be realized when the computer program is executed.

20. An image reconstruction device, wherein a trained target reconstruction model is provided on the image reconstruction device; the target reconstruction model comprises a first convolutional layer, a residual network module, a densely connected network module and a second convolutional layer; the image reconstruction device comprising:
- a first circuit configured to invoke the first convolutional layer to extract shallow layer features in the obtained image to be reconstructed;
- a second circuit configured to invoke the residual network module to obtain middle layer features from the shallow layer features;
- a third circuit configured to invoke the densely connected network module to obtain deep layer features from the middle layer features; and
- a fourth circuit configured to invoke the second convolutional layer to perform image reconstruction on the deep layer features so as to obtain a reconstructed image of the image to be reconstructed.

* * * * *